United States Patent [19]

Makhija et al.

[11] Patent Number: 5,672,426

[45] Date of Patent: Sep. 30, 1997

[54] HIGH BARRIER TRANSPARENT FILMS

[75] Inventors: Subhash Makhija, Westfield; M. Ishaq Haider, Bernardsville; Edward C. Chenevey, North Plainfield; Michael Jaffe, Maplewood, all of N.J.

[73] Assignee: Hoechst Celanese Corp, Somerville, N.J.

[21] Appl. No.: 575,845

[22] Filed: Dec. 21, 1995

Related U.S. Application Data

[63] Continuation of Ser. No. 262,409, Jun. 20, 1994, abandoned.

[51] Int. Cl.$^6$ .............. B32B 27/36; C08G 63/00; B29C 51/00
[52] U.S. Cl. .......... 428/332; 528/176; 528/190; 528/193; 528/194; 528/272; 528/361; 528/491; 528/502; 528/503; 264/164; 264/165; 264/291; 264/330; 428/332
[58] Field of Search .................. 528/176, 190, 528/193, 194, 272, 361, 491, 502, 503; 264/164, 165, 291, 330; 428/332

[56] References Cited

U.S. PATENT DOCUMENTS

| 4,624,872 | 11/1986 | Stuetz | 428/1 |
|---|---|---|---|
| 4,942,087 | 7/1990 | Motooka et al. | 428/332 |
| 5,298,591 | 3/1994 | Choe | 528/190 |

FOREIGN PATENT DOCUMENTS

| 0323160 | 12/1988 | European Pat. Off. | C08G 63/60 |
|---|---|---|---|
| 57-042726 | 3/1982 | Japan . | |

OTHER PUBLICATIONS

Kim et al. Polym. J (Tokyo) (1991), 23(11), 1339–45.
Castrell et al. Polymer Preprints, vol. 34, #1 (1993).
*Polymer Preprints*, vol. 34, No. 1 (Mar. 1993) "The Effect of Thermal Annealing on the Sorption and Transport Behavior of Liquid Crystalline Polymeric Barrier Materials", By G. R. Cantrell, B. D. Freeman and H. B. Hopfenberg, Department of Chemical Engineering, North Carolina State.

*Primary Examiner*—Samuel A. Acquah
*Attorney, Agent, or Firm*—James L. McGinnis

[57] ABSTRACT

A process for making a transparent film comprising a liquid crystalline polymer, and a transparent film made thereby having high barrier properties. In this process, the LCP is dissolved in an appropriate solvent, then cast into a film at ambient or near-ambient temperatures. The film optionally may be dried at elevated temperatures and/or reduced pressures to remove the solvent. The film is then annealed at a temperature between the glass transition temperature ($T_g$) and the melting point temperature ($T_m$) of the polymer. The result is a highly transparent film having liquid crystalline morphology and high barrier properties.

13 Claims, No Drawings

HIGH BARRIER TRANSPARENT FILMS

This application is a continuation of application Ser. No. 08/262,409, filed Jun. 20, 1994, now abandoned.

BACKGROUND OF THE INVENTION

This invention relates to a process for the production of transparent liquid crystalline polymer ("LCP") films, especially a low temperature process in which films are formed from a solution of an aromatic LCP dissolved in an aliphatic alcohol and then annealed.

It is well-known that certain polymers form liquid crystal structures. These polymers often exhibit a significant degree of anisotropy or orientation. See, e.g., U.S. Pat. No. 4,161,470.

When an LCP is extruded, it typically experiences high shear and becomes oriented in the machine direction, resulting in low machine direction tear strength and other anisotropic mechanical properties. Films extruded from a liquid crystalline polymer, therefore, tend to exhibit anisotropic mechanical properties. These crystalline films also tend to be opaque.

To form a transparent film or sheet, an amorphous material is generally needed. Common examples include glass, an amorphous inorganic material, and amorphous plastic films made of non-crystalline polymers such as polyacrylates, polyamides, polyvinyl alcohol, and the like. These polymers lack the mechanical advantages of LCP materials, such as high tensile strength, stiffness, and the like.

European Patent Application 0 323 160 discloses a process for forming amorphous, non-oriented, transparent films from certain aromatic LCP polyesters. In this process, the polymer to be formed into a film is typically dissolved in an aromatic alcohol solvent, preferably pentafluorophenyl, to form a solution which is then cast into a film and dried. The solution is formed by stirring polymer and solvent at an elevated temperature, e.g., 60° C. These films are allegedly 65–95% transparent, particularly 80–90%, at wavelengths above 500 nm in the visible region. The percent transmission of light through these films decreases below 500 nm.

U.S. Pat. No. 4,942,087, issued to Motooka et al., teaches films of wholly aromatic liquid crystalline polyesters that are non-oriented and transparent. This reference also teaches that those films may be oriented by drawing or heating; the oriented films exhibit polarizing effects.

U.S. Pat. No. 4,624,872, issued to Stuetz, teaches liquid crystalline polymer substrates that are transparent or light transmitting with respect to certain light frequencies.

U.S. Pat. No. 5,298,591, issued to Choe, teaches non-crystalline wholly aromatic polyesters for making transparent articles having high temperature properties.

Pending U.S. application Ser. No. 07/990,311, by Choe et al., teaches a low-temperature process for making an amorphous, transparent film, or other article, from a liquid crystalline polymer. In this process, the LCP is dissolved in an appropriate aliphatic alcohol and then formed into the desired article by appropriate means, all at ambient or near-ambient temperatures. However, this reference does not teach that these amorphous films may be converted to a liquid crystalline state without losing transparency, nor that such transparent crystalline films have significantly higher barrier properties than amorphous films.

SUMMARY OF THE INVENTION

The present invention comprises a process for making a transparent film having high barrier properties, and the film made by that process, where said film comprises a liquid crystal polymer of the formula

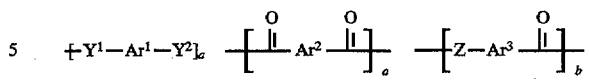

where $Ar^1$, $Ar^2$, and $Ar^3$ are each independently

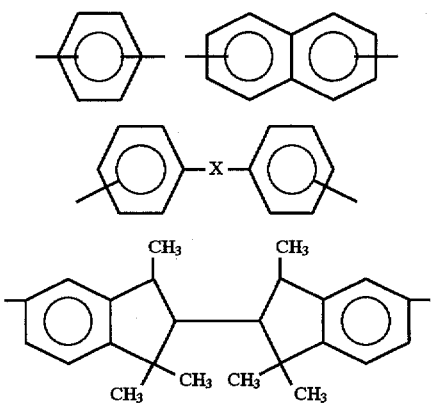

or mixtures thereof, in which each aromatic ring may be unsubstituted or may be substituted with one or more substituents chosen from the group consisting of alkyl groups having 1–6 carbon atoms, F, Cl, Br, and phenyl; Z is O, NH, or S; $Y^1$ and $Y^2$ are either both O, both NH, or both S, or one Y is NH and the other is O; X is a covalent bond, O, S, $SO_2$, CO, $CH_2$, $C(C_6H_5)H$, $C(C_6H_5)(CH_3)$, $C(C_6H_5)_2$, $C(CH_3)H$, $C(CH_3)_2$, $C(CF_3)_2$, or trimethylcyclohexyl; and a and b are independent positive integers.

The process comprises dissolving the polymer in a solvent (e.g., an aliphatic alcohol, trifluoroacetic acid/methylene chloride co-solvent) and forming a transparent film from the solution by a suitable method, and then annealing the transparent film. The polymer is dissolved, and the article formed, at a low temperature, preferably below about 40° C., e.g., at room temperature. The article optionally may then be dried at an elevated temperature and/or under reduced pressure. The film is annealed at a temperature between the glass transition temperature ($T_g$) and the melting point temperature ($T_m$) of the polymer. The result is a highly transparent film having liquid crystalline morphology and high barrier properties.

It is an object of the present invention to provide a process for making transparent LCP films having excellent barrier properties.

It is another object of the present invention to provide transparent LCP films having excellent barrier properties.

Other objects and advantages of the present invention will be apparent to those skilled in the art from the following description and the appended claims.

DETAILED DESCRIPTION OF THE PREFERRED EMBODIMENTS

In one preferred embodiment of the present invention, an LCP having repeat units derived from p-hydroxybenzoic acid, hydroquinone, and isophthalic acid (e.g., poly[p-oxybenzoate-co-p-phenylene isophthalate] where the mole ratio of the to the co-monomer is 57 to 43, i.e. about 40% by weight of the oxybenzoate monomer), and preferably having an inherent viscosity of between about 1.0 and about 1.5 dl/g is dissolved in 1,1,1,3,3,3-hexafluoro-2-propanol at ambient temperature in sufficient quantity to create an approximately 10% by weight solution of the LCP in the alcohol.

The solution is filtered and then cast in a conventional manner on a smooth, solid surface, e.g., glass plates, to form a film of the desired thickness, which is then removed from the surface. The film is then dried by any suitable method, including air drying, heating in a vacuum oven or in a convection oven, and the like. Preferably, the film is dried in a convection oven for several hours at about 100° C. and then drying is completed in a vacuum oven at about 100° C. and about 0.1 torr. At this stage in the process, the film is amorphous and transparent.

This film is then annealed, in vacuum or under nitrogen or other non-reactive gas medium, at about 200° C., typically for about 3–5 minutes. The annealing time may vary, but usually will be in the approximate range of 15 seconds to 3 hours, more commonly about 1–5 minutes. This process produces a transparent liquid crystalline morphology having excellent barrier properties.

In a second preferred embodiment of the present invention, the same polymer is dissolved in a co-solvent of 75% trifluoroacetic acid ("TFAA") and 25% methylene chloride ($CH_2Cl_2$) to form a 10% polymer solution by weight. The solution is filtered and cast on a glass plate at room temperature, the solvent is evaporated by conventional means, and the film is separated from the plate by submersion in water. The film at this stage appears to be transparent and non-brittle; typically, the film has a thickness of 5–15 micrometers, although the thickness may vary considerably depending on the dimension of the casting knife or other equipment used.

The solvent is extracted overnight by contact with methanol at room temperature, followed by washing with water and vacuum drying at room temperature, to thoroughly remove the solvent. The film is then annealed as in the previous embodiment to form a transparent liquid crystalline film.

Films formed by melt extruding the same polymer tend to be both highly crystalline and opaque. In contrast, the unique process of this invention appears to preserve the unoriented, noncrystalline arrangement of LCP molecules present in the solution when the solution is cast into an amorphous film and dried, and then the annealing step produces a frozen liquid crystalline morphology that remains transparent. Using this process, the molecules do not have the opportunity to organize themselves into an opaque crystalline structure. (However, if the film is heated above its melting point, the film can become highly crystalline and opaque.)

The solution is prepared, filtered, and cast or otherwise formed into a film at a temperature near room temperature, i.e., between 10° C. and 60° C., preferably between 20° C. and 30° C. The drying temperature may be any suitable temperature that facilitates drying at a desirable rate and does not destroy, damage or otherwise adversely affect the film. Preferably, the drying temperature is at or above the boiling point of the solvent, e.g., in the approximate range of 100° C. to 120° C. for an aliphatic alcohol such as hexafluoropropanol. However, the temperature may be lowered when vacuum drying, since the boiling point is reduced as the pressure decreases. The amount and intensity of drying needed will vary depending upon film thickness, shape and mass, and LCP solution concentration. Those skilled in the art will appreciate the wide range of drying options available, and will be able to choose a suitable approach in any given instance.

The LCP solution may be more or less concentrated than 10%, and is preferably in the range of from about 3% to about 30% by weight, more preferably from about 3% to about 20%. Of course, the concentration cannot exceed the saturation point for the particular LCP-solvent system at the temperature of the solution. The concentration also should not be so low that a uniform film cannot be formed.

The aliphatic alcohols that may be used in the polymer solutions of the present invention are those that have a low boiling point, preferably below 100° C.; such low-boiling alcohols have a relatively high vapor pressure and are readily removed in a drying step.

Preferably, the alcohols of the present invention have a $pK_a$ less than about 10, to facilitate the dissolution of the LCP. Alcohols in this category include fluorine-substituted alcohols of the formula $C(R)(CF_3)_2OH$ in which R is hydrogen, or an alkyl group which may be halogenated; preferably, R is H, $CH_3$, $CF_3$, or $CF_2Cl$. Examples of such alcohols include 1,1,1,3,3,3-hexafluoro-2-propanol, perfluoro-t-butyl alcohol, methylbis(trifluoromethyl) carbinol, and difluorochloromethylbis(trifluoromethyl) carbinol.

The term $pK_a$ is used in the conventional sense, to refer to the negative logarithm of the equilibrium constant of the dissociation reaction of the alcohol in aqueous solution at 25° C. As a simplified example, if the alcohol is represented as AOH, the dissociation reaction may be represented as $AOH \rightleftharpoons AO^- + H^+$, and the equilibrium constant, $K_a$, is defined as the product of the activities of the species $AO^-$ and $H^+$ divided by the activity of the species AOH; the $pK_a$ is defined as the negative logarithm of this constant. Of course, those skilled in the art will understand that the aforementioned species are not expected to exist completely independently in aqueous solution; e.g., $H^+$ will associate with at least one water molecule.

When a $TFAA/CH_2Cl_2$ co-solvent is used, it is typically about 75% TFAA by weight but the ratio of the two solvent components may vary; a preferred range for the TFAA weight percentage in the co-solvent is about 50–90%. Another particularly suitable co-solvent in the practice of this invention is a combination of pentafluorophenyl and 1,1,1,3,3,3-hexafluoro-2-propanol ("PFP/HFIP"); the ratio of these two solvent components may vary, as well. Other co-solvents may be formed from the aliphatic alcohols described above. In any case, the main requirement is that the co-solvent sufficiently dissolves the polymer to form a solution that may be used to cast a film. The components and proportions of co-solvents suitable for use in the present invention must be chosen to meet this requirement; the ability to make these selections is well within the ordinary skill in the art.

As used throughout this specification and the appended claims, the term "solvent" includes co-solvents as well as single-component solvents.

Any excess or undissolved polymer may be removed in a filtration step prior to film casting. Although this filtration step is recommended, it is not necessary unless undissolved solids are present. Preferably, the solution is filtered using a glass flit, polytetrafluoroethylene filter, or other filtration device that is inert to the polymer and alcohol, and will not introduce other ingredients.

The optimal annealing time for films according to the present invention depends upon the LCP and the annealing temperature, as well as the desired set of final film properties. This time will usually fall within the approximate range of from 15 seconds to 3 hours, although times outside that range are also contemplated. One having ordinary skill in the art will be able to determine the preferred annealing time and temperature for a particular film without undue experimentation.

A suitable annealing temperature range for the polymer of the foregoing preferred embodiments is approximately 150°–200° C., although a broader range of about 130°–280° C. may be suitable, based on the $T_g$ and $T_m$ of that polymer. For other polymers, the annealing temperature should be chosen between the $T_g$ and $T_m$ of the polymer being processed into film. Preferably, the annealing temperature should be at least about 10°–30° C. or more below $T_m$ to avoid undesirable crystallinity and opaqueness; the difference between $T_m$ and a suitable annealing temperature depends on the particular polymer and film characteristics, and can be determined simply by trial and error for any LCP film.

The permeability of the amorphous film of the above-described preferred embodiments is typically about 50–300×10$^{-3}$ Barrer for acetone at 35° C., compared to less than about 0.01 Barrer, and typically in the approximate range of 1–5×10$^{-3}$ Barrer, for the same film after it is annealed according to this invention. The annealing process generally decreases the permeability of the film by at least one or two orders of magnitude. (Note: 1 Barrer=7.52×10$^{-14}$ cm$^2$/Pascal-sec, at 0° C. and 1 atmosphere pressure.)

A variety of LCP copolymers may be used to form films according to the present invention. These copolymers have aromatic repeating units and may be represented by the formula

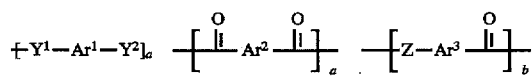

where Ar$^1$, Ar$^2$, and Ar$^3$ are each independently

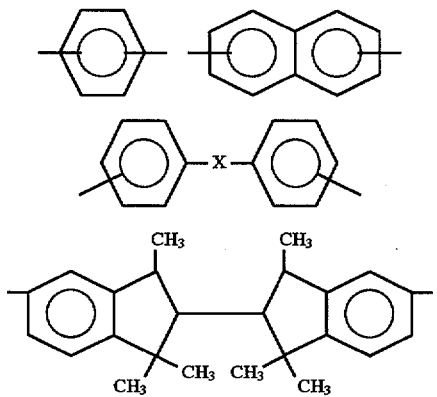

or mixtures thereof, in which each aromatic ring may be unsubstituted or may be substituted with one or more substituents chosen from the group consisting of alkyl groups having 1–6 carbon atoms, F, Cl, Br, and phenyl; Z is O, NH, or S; Y$^1$ and Y$^2$ are either both O, both NH, or both S, or one Y is NH and the other is O; X is a covalent bond, O, S, SO$_2$, CO, CH$_2$, C(C$_6$H$_5$)H, C(C$_6$H$_5$)(CH$_3$), C(C$_6$H$_5$)$_2$, C(CH$_3$)H, C(CH$_3$)$_2$, C(CF$_3$)$_2$, or trimethylcyclohexyl; and a and b are independent positive integers.

The films of the present invention are highly transparent to visible light. For example, at least about 85% and preferably at least about 90% of light in the wavelength range of 450–700 nm can be transmitted through a film 0.38 mil thick made according to this invention. In the wavelength range of about 500–700 nm, at least about 90%, and preferably at least about 95% light transmission may be attained in such films.

At the same time, these transparent films have high barrier properties typically found in crystalline LCP films. This combination of transparency and barrier properties makes these films uniquely suited for applications where both are desirable, e.g. in certain types of packaging.

The following Examples are presented to further illustrate the present invention. However, the invention should not be construed as limited to the illustrated embodiments.

EXAMPLE I

A 10% by weight LCP solution was made by dissolving 100 grams of poly[p-oxybenzoate-co-p-phenylene isophthalate] in 900 grams of 1,1,1,3,3,3-hexafluoro-2-propanol at ambient temperature (about 25° C.). This polymer comprised repeating units in a mole ratio of oxybenzoate monomer to co-monomer of 57 to 43, and had a viscosity of 1.14 dl/g as determined on a 0.1% solution in HFIP/PFP 50/50 by volume.

The solution was filtered through a Millipore Teflon filter type FA 1.0 µm under 100 psi nitrogen pressure. Films of various thickness were cast at ambient temperature onto glass plates. The resulting transparent, clear films were soaked in distilled water to separate them film the glass. They were then dried at 100° C. for five hours in a convection oven, and for a further 16 hours in a vacuum oven at 0.1 torr and 100° C.

The dried films were transparent, amorphous (as shown by wide-angle X-ray and thermal analysis), and ranged in thickness from 0.5 to 3 mils.

EXAMPLE II

An LCP solution was made as in Example I, except that the solvent was TFAA/CH$_2$Cl$_2$ (75%/25%). The solution was filtered and then cast on a glass plate using an Erichsen casting machine at room temperature in a clean room facility. The solvent was evaporated at room temperature in air and then submerged in a water bath to cause the film to separate from the glass plate. This process was repeated and several film samples were obtained, ranging in thickness from 5–15 micrometers depending on the size of the casting knife. The as-cast films so obtained were transparent and amorphous.

The as-cast films contained about 3–5% residual solvent by weight. The solvent was extracted with methanol overnight at room temperature, followed by washing with water and vacuum drying at room temperature to complete the removal of solvent.

A number of film samples were annealed under one of the following conditions: 200° C. in a vacuum; 300° C. a under nitrogen; 330° C. under a nitrogen atmosphere.

Samples of amorphous and heat-annealed film were tested to measure the permeability of acetone therethrough. This is believed to be a reasonable indication of the permeability of other molecules therethrough, unless such a molecule interacts chemically with the polymer. The permeability test was performed according to the following procedure:

Acetone vapor and nitrogen gas were contacted with one side of the film being tested at 35° C. The weight of the film sample was continuously charted over time; after an initial lag time, the weight began to increase until it reached a maximum value and leveled off. The solubility of the acetone in the polymer was determined from the maximum weight gain, the diffusivity ("D") of the acetone through the film was calculated from the film thickness ("l") and the lag time ("L") according to the formula D=l$^2$/6L, and the permeability was calculated from the product of solubility and diffusivity. These results are shown in Table 1, below.

TABLE 1

| Annealing Protocol | Acetone Activity | Permeability (Barrers × 10³) |
|---|---|---|
| As-Cast | 0.15 | 268 |
| Amorphous | 0.15 | 214 |
| Films | 0.12 | 120 |
|  | 0.12 | 68 |
| 200° C. | 0.15 | 2.2 |
| in vacuum | 0.15 | 1.2 |
| 300° C. | 0.15 | 3.3 |
| under nitrogen | 0.15 | 3.2 |
| 330° C. | 0.15 | 8.9 |
| under | 0.15 | 4.5 |
| nitrogen | 0.15 | 4.8 |

From the results in Table 1, it is clear that annealing the as-cast amorphous film decreases the permeability thereof (i.e., improves the barrier properties) by approximately two orders of magnitude. The as-cast film sample permeabilities (in Barrers×10³) ranged from 68 to 268, while those of the film annealed at 200° C. were 1.2 and 2.2.

EXAMPLE III

Films having thicknesses of about 1.35–2.85 mils were made according to the procedure set forth in the foregoing Example II. After the annealing step, film samples were subjected to various amounts of drawing at various temperatures, reducing their thickness, as shown in Table 2.

It was found that stretching or drawing the film at a temperature below $T_m$ could improve the tensile properties of the film without loss of transparency. The drawing conditions and tensile results for a number of film samples are shown in Table 2; in each case, the same draw ratio and other conditions were applied to the film in both the machine direction ("MD") and the transverse, or cross-machine, direction ("TD"). The properties of undrawn films (draw ratio=1) are shown for comparison. The tensile properties were measured by standard methods well-known in the art.

In Table 2: "Mils" refers to film thickness, both initially ("I") and after drawing ("D"); draw ratio ("R") and temperature (°C.) are shown; and three tensile properties, tensile strength ("S") in Kpsi, initial tensile modulus ("M") in Mpsi, and tensile elongation ("E") in percent are given for both MD and TD.

TABLE 2

| Mils | | Draw | | S (Kpsi) | | M (Mpsi) | | E (%) | |
|---|---|---|---|---|---|---|---|---|---|
| I | D | R | °C. | MD | TD | MD | TD | MD | TD |
| 1.35 | 1.35 | 1 | — | 8.2 | 7.8 | .37 | .36 | 40 | 29 |
| 1.35 | 0.86 | 1.25 | 120 | 10.9 | 10.3 | .52 | .39 | 24 | 18 |
| 1.35 | 0.74 | 1.35 | 120 | 10.3 | 11.1 | .50 | .45 | 15 | 14 |
| 1.35 | 0.62 | 1.48 | 120 | 11.9 | 10.8 | .55 | .46 | 17 | 17 |
| 1.35 | 0.60 | 1.50 | 120 | 16.5 | 13.2 | .63 | .56 | 21 | 28 |
| 1.35 | 0.76 | 1.33 | 210 | 10.1 | 11.4 | .50 | .50 | 4 | 7 |
| 1.35 | .62 | 1.48 | 210 | 14.0 | 13.5 | .60 | .63 | 6 | 7 |
| 1.35 | .72 | 1.37 | 210 | 11.1 | 11.3 | .46 | .53 | 6 | 7 |
| 1.35 | .66 | 1.43 | 210 | 14.1 | 10.1 | .56 | .55 | 8 | 4 |
| 2.85 | 2.85 | 1 | — | 8.1 | 7.7 | .34 | .33 | 23 | 23 |
| 2.85 | 1.78 | 1.27 | 120 | 10.4 | 8.5 | .39 | .36 | 23 | 19 |
| 2.85 | 1.66 | 1.31 | 120 | 8.8 | 8.4 | .37 | .39 | 8 | 10 |
| 2.85 | 1.24 | 1.51 | 120 | 10.6 | 11.7 | .40 | .51 | 9 | 14 |
| 2.85 | 1.52 | 1.37 | 120 | 11.2 | 9.4 | .49 | .39 | 7 | 8 |
| 2.85 | 1.32 | 1.47 | 120 | 10.9 | 9.3 | .50 | .41 | 9 | 7 |

Many variations and equivalents of the present invention will occur to those skilled in the art. The present invention is not limited to the embodiments illustrated or described, but includes all the subject matter within the spirit and scope of the appended claims and of the foregoing disclosure.

We claim:

1. A process for making a transparent film that comprises a liquid crystalline polymer having repeat units derived from p-hydroxybenzoic acid, hydroquinone, and isophthalic acid, comprising the steps of:

dissolving said liquid crystalline polymer at a temperature below about 40° C. in a solvent in which said polymer is soluble, which solvent is selected from the group consisting of: an aliphatic alcohol having a boiling point below about 100° C. and a $pK_a$ below about 10; a co-solvent of trifluoroacetic acid and methylene chloride; a co-solvent of pentafluorophenol and 1,1,1,3,3,3-hexafluoro-2-propanol; and mixtures thereof;

forming an amorphous film from said solution at a temperature below about 40° C.;

annealing said amorphous film at a temperature between the glass transition temperature and the melting point temperature of said polymer; and stretching said annealed film at least 25% of its length in both the machine direction and the transverse direction, at a temperature below the melting point temperature of said polymer.

2. A process according to claim 1 wherein said film forming step comprises casting said solution on a surface.

3. A process according to claim 1 wherein said annealing is performed at a temperature that is at least about 10°–30° C. below said melting point temperature.

4. A process according to claim 1 wherein said solvent comprises 1,1,1,3,3,3-hexafluoro-2-propanol.

5. A process according to claim 1 wherein said solvent comprises 75% trifluoroacetic acid and 25% methylene chloride by weight.

6. A transparent film made according to the process of claim 1.

7. A film according to claim 6 that is at least about 90% transparent to light having a wavelength in the range of from about 450 nm to about 700 nm.

8. A film according to claim 6 that is at least about 90% transparent to light having a wavelength in the range of from about 500 nm to about 700 nm.

9. A film according to claim 6 that is at least about 95% transparent to light having a wavelength in the range of from about 500 nm to about 700 nm.

10. A transparent film made according to the process of claim 1 wherein the permeability of said film to acetone at 35° C. is less than about 0.01 Barrer.

11. A film according to claim 10 wherein said permeability is in the approximate range of from 0.001 to 0.005 Barrer.

12. The process recited in claim 1, wherein the mole ratio of oxybenzoate monomer units to p-phenylene isophthalate units is about 57 to 43.

13. The process recited in claim 1, wherein said liquid crystalline polymer is dissolved in said solvent to form a solution comprising about 3% to about 30% by weight of said liquid crystalline polymer.

* * * * *